United States Patent [19]

Bunge

[11] 4,414,955
[45] Nov. 15, 1983

[54] APPARATUS FOR DRESSING ABRASIVE WHEELS

[76] Inventor: Lothar P. Bunge, 26648 Ryan, Warren, Mich. 48091

[21] Appl. No.: 320,276

[22] Filed: Nov. 12, 1981

[51] Int. Cl.³ .............................................. B24B 53/00
[52] U.S. Cl. .................................................. 125/11 T
[58] Field of Search ................ 125/11 R, 11 T, 11 A, 125/11 M

[56] References Cited

U.S. PATENT DOCUMENTS

| | | | |
|---|---|---|---|
| 1,912,410 | 6/1933 | Shotey | 125/11 T |
| 2,274,959 | 3/1942 | Headbloom | 125/11 T |
| 2,637,312 | 5/1953 | Alderman . | |
| 3,273,554 | 9/1966 | Bunge . | |
| 3,830,215 | 8/1974 | Bärtosek | 125/11 T |

Primary Examiner—Harold D. Whitehead
Attorney, Agent, or Firm—Krass, Young & Schivley

[57] ABSTRACT

Apparatus for dressing abrasive wheels employed for grinding involute surfaces such as involute gear teeth includes a fixture for generating involute curves cooperatively coupled with a turntable and a dressing tool. The fixture includes a carriage bar reciprocably mounted on the turntable which drives the dressing tool. The carriage bar is captured between a stationary base circle disc and a pair of laterally movable rollers mounted on a rotatable portion of the fixture. Rotation of the fixture produces lateral translation of the carriage bar in a manner to generate involute movement of the tool. The fixture is swingably mounted to allow the mounting position of the carriage bar to be easily changed in order to generate a mirror image of the involute curve. The fixture and turntable are mounted on a base for freedom of movement along two perpendicular axes to permit rapid indexing and set up.

22 Claims, 8 Drawing Figures

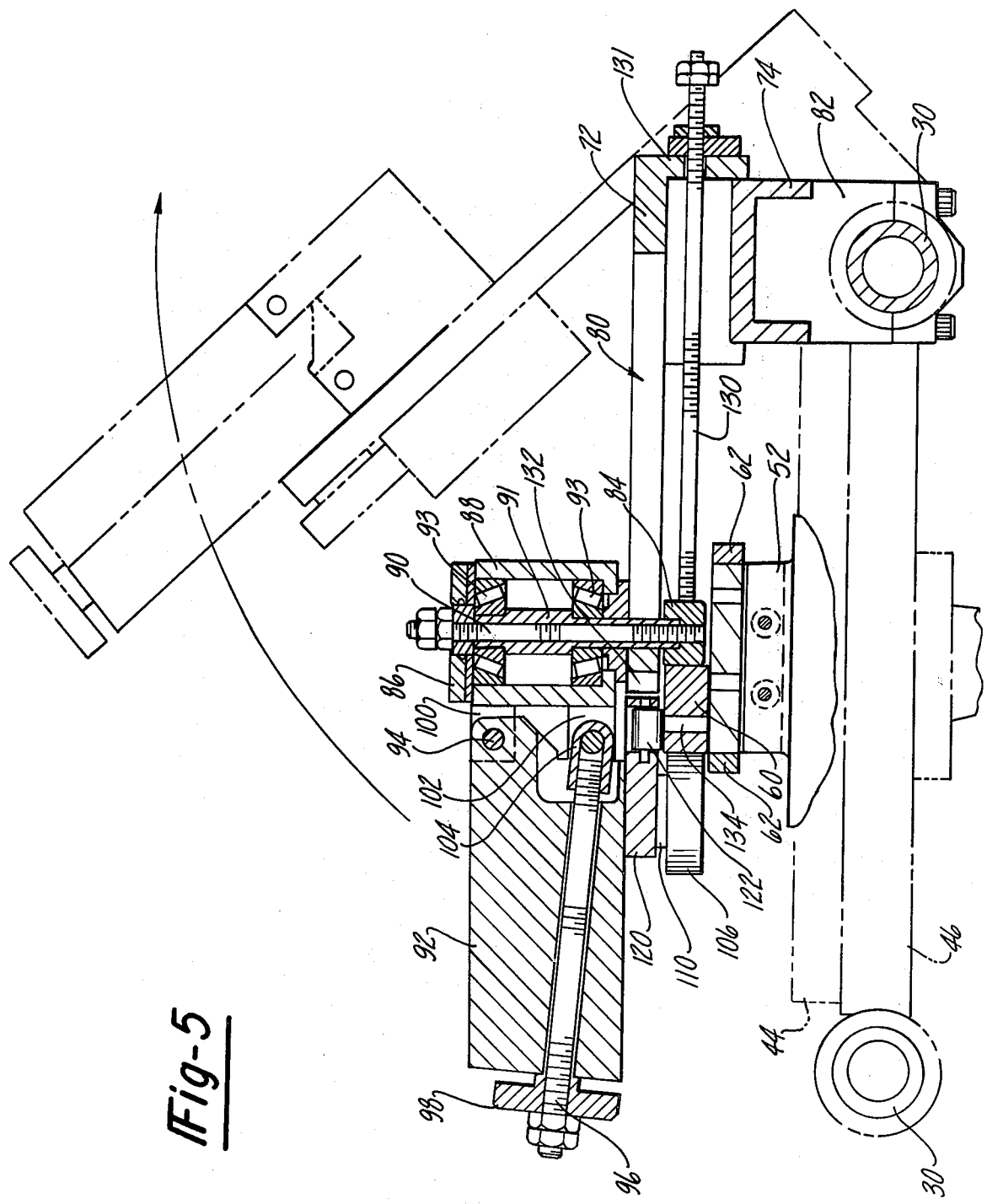

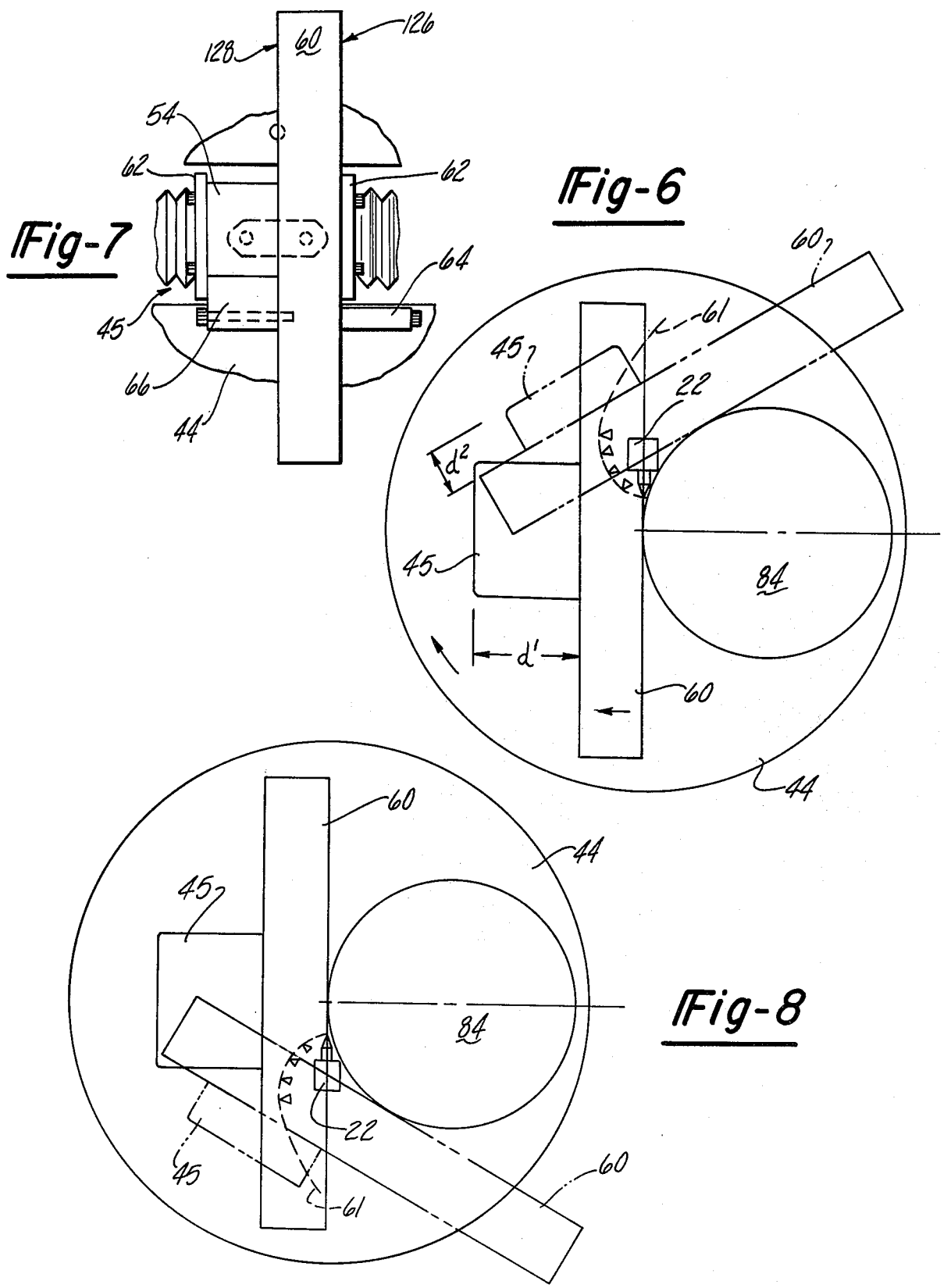

APPARATUS FOR DRESSING ABRASIVE WHEELS

TECHNICAL FIELD

The present invention generally relates to apparatus for dressing abrasive wheels, and deals more particularly with a machine for forming involute surfaces on the face of a grinding wheel or the like.

BACKGROUND ART

Surface grinding apparatus normally includes a cylindrical grinding wheel mounted on a horizontal rotatable spindle disposed above a reciprocating or rotating table or chuck. The part to be ground, such as a gear or the like, is mounted on the table or chuck. Surface grinding frequently requires that the face of the grinding wheel be of a specific non-planar shape so as to permit contour grinding of the workpiece. In the case of an involute gear, i.e. a gear having involutely shaped teeth, the face of the grinding wheel must possess a pair of involute surfaces which are the mirror image of each other for grinding opposed surfaces of the teeth.

Devices for producing involute displacement of a dressing tool are known in the art as evidenced by U.S. Pat. No. 2,274,959 issued to Headbloom. This prior art device is intended to be mounted on the same table upon which the part be ground is secured. The Headbloom device possess a number of shortcomings, however. For example, it is not possible to alter either the elevation or lateral position of the dressing tool relative to the base upon which it is mounted, consequently, set up and indexing of the device relative to the grinding wheel is extremely difficult and sometimes impossible in some applications without the use of special adaption fixtures.

It is therefore a primary object of the present invention to provide a wheel dresser which is mounted in a position which remains in a constant, fixed relationship to the grinding wheel.

Another important object of the present invention is to provide a dresser as described above which may be employed with a variety of grinding machines without the need for special fixturing or the like, and is capable of dressing, involute, tangent and radius contours.

A still further object of the present invention is to provide a dresser of the type described above which may be set up and indexed rapidly and with a high degree of precision and repeatability.

Other objects and advantages of the present invention will be made clear or will become apparent during the course of the following description of the invention.

DISCLOSURE OF THE INVENTION

According to the present invention a mounting assembly having freedom of movement along two essentially perpendicular axes supports a turntable which is rotatable about a third axis and disposed immediately above the grinding wheel. A carriage bar having a pair of opposed guide surfaces is reciprocably mounted on the turntable and is captured between a stationary cylindrical disc and a pair of rollers mounted on a rotatable frame. The stationary disc possesses a curvature identical to that of the base circle of the gear to be ground. Rotation of the frame produces lateral translation of the carriage bar in order to generate involute displacement of the dressing tool which depends donwardly from, and is connected to, the carriage bar. The frame may be pivoted upwardly to disengage the disc and rollers from the carriage bar so that the mounting position of the latter may be altered in order to produce the mirror image of the involute displacement.

BRIEF DESCRIPTION OF THE DRAWINGS

In the drawings, which are to be read in conjunction with the specification and in which like reference numerals are employed to designate identical components of the various views:

FIG. 5 is a sectional view taken along the line 5—5 of FIG. 4, phantom lines indicating the frame in its raised, disengaged position;

FIG. 6 is a diagrammatic plan view indicating the involute path of the dressing tool produced by one mounting position of the carriage bar;

FIG. 7 is a fragmentary, plan view of the carriage bar shown in another mounting position; and, FIG. 8 is a view similar to FIG. 6 but showing the involute curve produced by the dressing tool with the carriage bar in the mounting position depicted in FIG. 7.

BEST MODE FOR CARRYING OUT THE INVENTION

Figure 1:
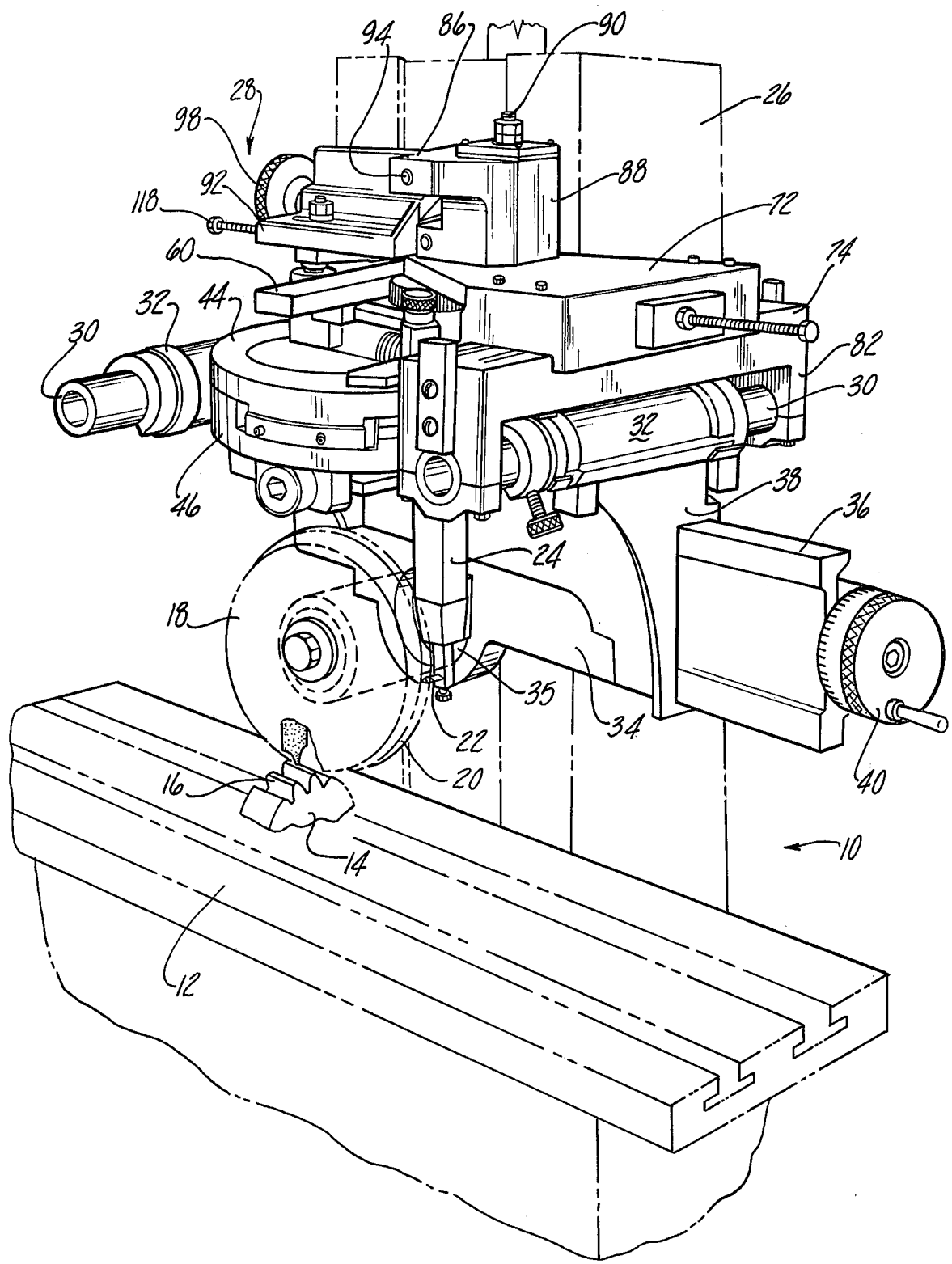
FIG. 1 is a perspective view of the apparatus for dressing abrasive wheels which forms the preferred embodiment of the present invention, shown mounted in operative relationship on a grinding machine.

Referring now to the drawings, the present invention broadly relates to dressing apparatus 28 adapted to be mounted on a gear grinding machine 10 which includes a rotatable, abrasive wheel 18 for grinding the teeth 16 in a product such as gear 14. The teeth 16 of gear 14 are of the involute type, consequently, the dressing face 20 of wheel 18 is contoured to define a pair of involute surfaces for grinding opposing faces of teeth 16.

Gear 14 is mounted by any suitable means on a reciprocable table 12 in order to draw the gear back and forth beneath the wheel 18. Machine 10 includes an upright support 26 upon which the dressing apparatus 28 is mounted by conventional means for elevational travel.

Apparatus 28 includes a base plate 34 having an aperture 35 therein through which a rotatable spindle (not shown) extends for rotating wheel 18. Base 34 includes lateral extension defining a guide bar 36 upon which there is slidably mounted a slide bracket 38. Slide bracket 38 is driven for sliding movement on bar 36 with high positional accuracy by a conventional micrometer screw drive including a hand operated wheel 40 mounted on one end of bar 36. Thus, it may be appreciated that the remaining portion of the dressing apparatus 28 to be described below is slidable along the longitudinal axis of guide bar 36.

A pair of spaced apart, parallel cylindrical guides 30 are secured to the upper end of slide bracket 38 and have slidably mounted thereon a pair of respectively corresponding slides 32. A generally circular turntable base 46 is disposed between and secured to slides 32 for sliding movement on guides 30 in a direction transverse to the longitudinal axis of guide bar 36. A rotatable turntable plate 44 is mounted, as with roller bearings or the like, on turntable base 46. Turntable 44 and base 46 may be similar to that described in U.S. Pat. No. 3,273,554, the entire disclosure of which is incorporated herein by reference.

Figure 2:
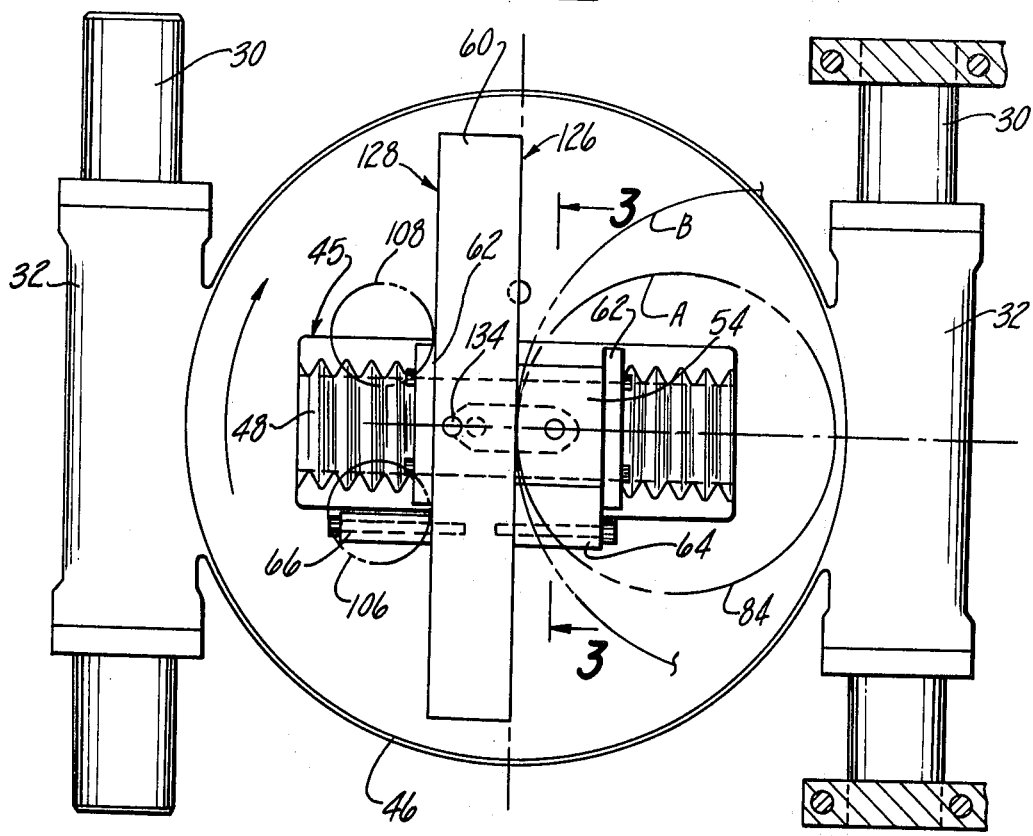
FIG. 2 is a plan view of the apparatus shown in FIG. 1 with the frame removed for sake of clarity, the position of the rollers and alternate base discs being shown in broken lines.
Figure 3:
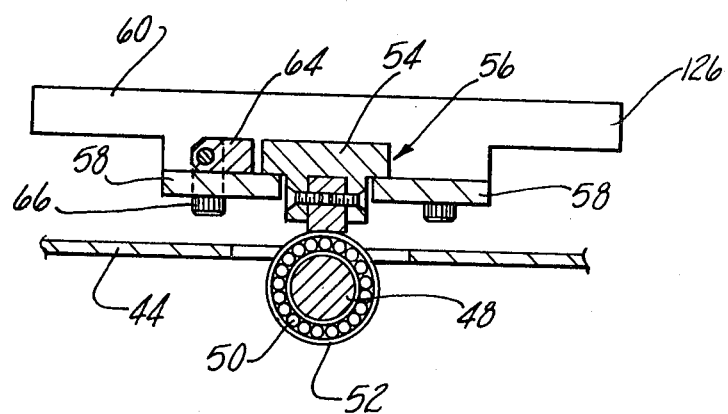
FIG. 3 is a sectional view taken along the line 3—3 in FIG. 2.
Figure 4:
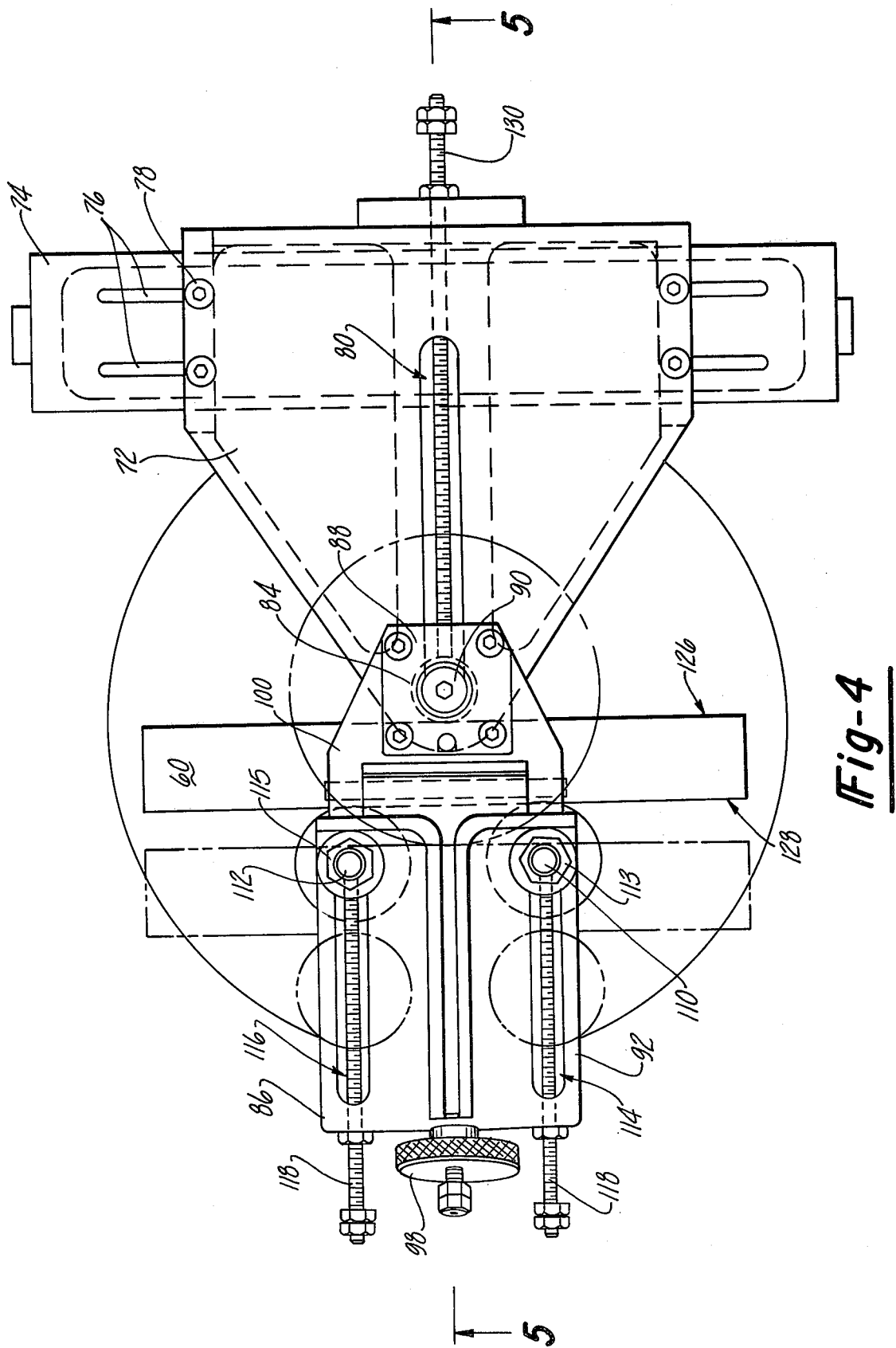
FIG. 4 is a plan view of the frame associated with the apparatus shown in FIG. 1, an alternate base disc being shown in the phantom along with the respectively associated alternate position of the rollers and carriage bar.

As best seen in FIGS. 2 and 3, turntable 44 is provided with a rectangular opening 45 therein within which there is mounted on turntable 44 a cylindrical support bar 48. A generally cylindrical sleeve 52 is slidably mounted in the manner shown in U.S. Pat. No. 3,273,554, using roller bushing 50 on support bar 48 which provides sliding movement back and forth between opposite extremities of opening 45. The gibs of a T-shaped guide 54 secured on the upper surface of sleeve 52 are slidably received within ways 56 of a rectangularly shaped carriage bar 60. Carriage bar 60 includes a pair of lateral extensions 58 in order to retain bar 60 on guides 54. It may thus be appreciated that carriage bar 60 and guide 54 are slidably along support bar 48 and that carriage bar 60 is independently slidable along guide 54. A pair of stops 62 secured on opposite ends of guide 54 engage carriage bar 60 and thus define the outer limits of displacement of bar 60 along guide 54. A pair of generally rectangular locking elements 64 and 66 pivotally mounted on opposite sides of carriage bar 60 may be selectively pivoted into locking, interposed relationship between a lateral extension of one of the stops 62 and carriage bar 60, thereby locking carriage bar 60 in one of two possible mounting positions on guide 54.

Dressing tool 22 is mounted on a downwardly extending tool holder 24 which in turn is secured to slide 52 in a manner similar to that described in U.S. Pat. No. 3,273,554. It is therefore apparent that appropriate lateral translation of carriage bar 60 (produced by sliding movement upon support bar 48 and rotational movement of turntable 44) will produce involute displacement of dressing tool 22 so as to produce involute contours on the face 20.

Dressing apparatus 28 further includes a frame defined by first frame portion 72 and second frame portion 86. First frame portion 72 is generally triangular in shape and is slidably mounted by means of slots 76 and cap screws 78 on a U-shaped support bracket 74, which includes mounting legs 82 journaled for rotation on the outer extremities of one of the guides 30. Thus, first frame portion 72 and bracket 74 are pivotal about the longitudinal axis of one of the guides 30.

A cylindrically shaped base circle disc 84 is removably mounted on the free end of frame portion 72 by means of a threaded stud 90 which is mounted on second frame portion 86 and extends downwardly through an adjustment slot 80 in frame portion 72. An adjustable screw stop 130 is threadably mounted on wall 131 of frame portion 32 and bears against a section of the periphery of disc 84 to assist holding the latter in position. Disc 84 may be removed and replaced by a disc of differing diameter simply by releasing screw 130 and unscrewing disc 84 from the lower end of stud 90.

Second frame portion 86 includes a hub 88 which is mounted for rotation on stud 90 by means of a bushing 91 and roller bearings 93. Second frame portion 86 is further defined by an arm 92 swingably mounted on an upper clevis 100 of hub 88 by means of a pivot pin 94. A mounting plate 120 is slidably attached to the bottom of arm 92 by a pair of shafts 110 and 112 which extend downwardly through corresponding slots 114 and 116 in arm 92. A pair of steel rollers 106 and 108 are rotatably mounted on the lower ends of shafts 110 and 112 respectively. The assembly of rollers 106, 108, bolts 110, 112 and mounting plate 120 is slidable in slots 114, 116 and may be secured in any position therealong by means of nuts 113 and 115 secured to the threaded upper extremities of shafts 110, 112. A pair of adjustment screw stops 118 threadably received in an outer wall of arm 92 bear against shafts 110 and 112 respectively to adjust the position of rollers 106, 108. A roller member 112 mounted on the bottom of plate 120 provides smooth rolling engagement between the frame and carriage bar 60.

Arm 92 may be locked against pivotal movement by means of a draw bar 96 having one end thereof pivotally attached by means of a pivot pin connection 104 to lower clevis 102 on hub 88. The outer threaded end of draw bar 96 threadably receives a knob 98 which bears against the outer end of arm 92, thereby urging rollers 106 and 108 into engagement with draw bar 60 and preventing pivotal movement of arm 92. With the frame described above in its operating position as shown in FIGS. 1 and 5, the periphery of disc 84 and rollers 106, 108 respectively bear against opposing guide surfaces 126 and 128 of carriage bar 60. To facilitate initial set up and positioning of the apparatus 28, and indexing pin (not shown) may be inserted through an index notch 132 on first frame portions 72 into index hole 134 in carriage bar 60.

In use, involute displacement of dressing tool 22 is produced simply by swinging the second frame portion 86 about a pivot point defined by stud 90. Pivoting of second frame portion 86 causes guide surface 126 of carriage bar 60 to roll around a portion of the periphery of disc 84 as a result of pressure imposed on guide surface 128 by rollers 106, 108. This lateral translation of carriage bar 60 in an involute pattern is translated to the tool 22 by the combination of sliding movement of carriage bar 60 on support bar 48 and rotation of turntable 44. The translation described immediately above may best be understood by reference to FIG. 6 wherein the position of carriage bar 60 relative to the path of the dressing tool 22 is depicted. The involute path described by translation of dressing tool 22 is designated by the broken line 61. The lateral movement of the carriage bar 60 relative to turntable 44 is also apparent in FIG. 6 wherein the letters $d^1$ and $d^2$ indicate the distances between the edge of opening 45, in turntable 44 and the carriage bar 60 when the bar 60 is in its starting and finishing positions.

As previously discussed, one sweep of the second frame portion 86 results in the dressing of one half of face 20 of wheel 18. In order to dress the other half of face 20, the following procedure is followed. Wheel 98 is released and arm 92 is swung upwardly about pivot pin 94 in order to disengage rollers 106, 108 from carriage bar 60. The entire frame is then pivoted upwardly about mounting legs 82 and away from turntable 44. Locking element 64 is swung to its disengaged position and the carriage bar 60 is moved from the position thereof shown in FIG. 2 to the alternate position depicted in FIG. 7. Locking element 66 is then pivoted into locking relation between stop 62 and guide surface 128. Turntable 44 is pivoted 180° after which the frame is lowered back to its operative position and wheel 98 is tightened to draw the carriage bar 60 between disc 84 and rollers 106, 108. Sweeping of the second frame portion 86 then results in translation of the carriage bar 60 and dressing tool 20 as shown in FIG. 8.

In order to generate involutes corresponding to various sizes of base circles, disc 84 is simply replaced by alternately sized discs whose diameters correspond to the base circle of the gear 14 being ground.

From the foregoing, it is apparent that the dresser apparatus described above not only provides for the reliable accomplishment of the objects of the invention but does so in a particularly efficient and reliable manner. It is recognized, of course, that those skilled in the art may make various modifications or additions to the preferred embodiment choosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. Apparatus for dressing a wheel, comprising:
    a base;
    a support;
    means for mounting said support on said base including means for rotatably mounting said support relative to said wheel about a first axis;
    a carriage having a pair of opposed guide surfaces;
    a dressing tool attached to said carriage for movement therewith and extending outwardly from one side of said support;
    means for slidably mounting said carriage on the other side of said support, said carriage being rotatable with said support; and
    a frame assembly including first and second frame portions rotatable relative to each other about a second axis substantially parallel to said first axis, a cylindrical disc mounted on said first frame portion and having a section of the periphery thereof bearing against one of said opposing guide surfaces, and a pair of spaced apart rollers mounted on said second frame portion and bearing against the other of said guide surfaces.

2. The apparatus of claim 1, including means for mounting said first frame portion for rotation relative to said second frame portion about a third axis generally perpendicular to said second axis.

3. The apparatus of claim 2, wherein said first frame portion is secured to said mounting means and there is further provided means for adjusting the mounting position of said disc and second frame portion relative to said first frame portion.

4. The apparatus of claim 3, wherein said adjusting means includes an elongate slot defined in said first frame portion and a screw threadably mounted on said first frame portion and engaging the periphery of said disc.

5. The apparatus of claim 1, including means for urging said pair of rollers toward said disc.

6. The apparatus of claim 1, including means for mounting said pair of rollers for selective siding movement on said second frame portion.

7. The apparatus of claim 1, wherein said means for slidably mounting said carriage includes:
    a slide member mounted on said support for sliding movement in a direction substantially perpendicular to said first axis,
    a guide mounted on said slide member, and
    means for slidably attaching said carriage on said guide for sliding movement independent of said slide member.

8. The apparatus of claim 7, wherein said means for slidably mounting said carriage includes means for selectively locking said carriage against movement on said guide.

9. The apparatus of claim 7, wherein said locking means includes a pair of locking elements for respectively locking said carriage in either of two positions along said guide.

10. The apparatus of claim 1, including means defined in said second frame portion and said carriage for indexing said dressing tool relative to said wheel.

11. The apparatus of claim 1, wherein said mounting means includes:
    a pair of spaced apart guides, and
    a pair of slides respectively slidably mounted on said guides, said rotatable mounting means being secured to said slide for sliding therewith along third and fourth axes transverse to said first axis.

12. The apparatus of claim 11, wherein said mounting means includes a slide assembly for allowing movement of said rotatable mounting means in a direction along a fifth axis transverse to said first, third and fourth axes.

13. The apparatus of claim 1, including means for mounting said tool for sliding movement on said plate in a direction transverse to said first axis.

14. Apparatus for dressing a wheel, a comprising:
    a mounting assembly having freedom of movement along first and second essentially perpendicular axes;
    a turntable carried by said mounting assembly and rotatable about a third axis of essentially perpendicular to each of said two axes;
    a dressing tool;
    a carriage having a pair of opposed guide surfaces and mounted on said turntable for reciprocating movement in a direction transverse to said third axis, said tool being mounted for movement with said carriage;
and
    a frame assembly carried by said mounting assembly and including a stationary cylindrical disc engaging one of said opposing surfaces and a one frame portion rotatable about a fourth axis and having a pair of spaced apart rollers engaging the other of said opposing surfaces,
    said carriage being responsive to rotation of said one frame portion for driving said turntable in a manner to produce involute displacement of said dressing tool.

15. The apparatus of claim 14, wherein said frame assembly includes another frame portion upon which said disc is mounted and means for connecting said first and second frame portions for pivotal movement relating to each other about an axis transverse to said fourth axis.

16. The apparatus of claim 15, wherein said frame assembly includes means for pivotally mounting said another frame portion on said mounting assembly.

17. The apparatus of claim 14, including:
    means for removably mounting said disc on said one frame portion; and means for adjusting the mounting position of said disc on said one frame portion.

18. The apparatus of claim 14, including means for reciprocably mounting said carriage on said turntable, said mounting means including a slide member mounted on said turntable for sliding movement in a direction substantially perpendicular to said third axis.

19. The apparatus of claim 18, wherein said mounting means includes:
a guide mounted on said slide member, and
means for slidably attaching said carriage on said guide for sliding movement independent of said slide member.

20. The apparatus of claim 19, wherein said mounting means includes means for selectively locking said carriage against movement in either of two positions on said guide.

21. The apparatus of claim 14, wherein said mounting assembly includes:
a pair of spaced apart guides,
a pair of slides respectively slidably mounted on said guides.

22. The apparatus of claim 21, wherein said mounting assembly includes a slide assembly supporting said slides for movement of said turntable along said second axis.

* * * * *